United States Patent
Li et al.

(10) Patent No.: US 7,949,809 B2
(45) Date of Patent: May 24, 2011

(54) PERIPHERAL COMPONENT INTERCONNECT EXPRESS INTERFACE AND METHOD FOR SIGNAL PROCESSING

(75) Inventors: Shi Li, Shanghai (CN); Chien Chun Shao, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 749 days.

(21) Appl. No.: 11/852,976

(22) Filed: Sep. 10, 2007

(65) Prior Publication Data

US 2008/0151781 A1   Jun. 26, 2008

(30) Foreign Application Priority Data

Dec. 22, 2006  (CN) .......................... 2006 1 0147794

(51) Int. Cl.
*G06F 13/00* (2006.01)
*H04J 3/16* (2006.01)
(52) U.S. Cl. ........................................ 710/100; 370/469
(58) Field of Classification Search .................. 710/100; 370/469
See application file for complete search history.

(56) References Cited

U.S. PATENT DOCUMENTS

| | | | | |
|---|---|---|---|---|
| 6,993,667 | B1 * | 1/2006 | Lo ................................. | 713/320 |
| 7,152,136 | B1 * | 12/2006 | Charagulla ................... | 710/315 |
| 7,257,655 | B1 * | 8/2007 | Burney et al. ................. | 710/105 |
| 2005/0120163 | A1 * | 6/2005 | Chou et al. ..................... | 711/103 |

OTHER PUBLICATIONS

Intel, Phy Interface for the PCI Express Architecture, Jul. 21, 2007, Intel Corporation.*
Intel, Phy Interface for the PCI Express Architecture, Jun. 19, 2003, version 1.0.*

* cited by examiner

*Primary Examiner* — Mark Rinehart
*Assistant Examiner* — Christopher A Daley
(74) *Attorney, Agent, or Firm* — Squire, Sanders & Dempsey (US) LLP

(57) ABSTRACT

The present invention discloses a PCI Express interface and a method of signal processing, and particularly relates to the physical coding sub-layer that transmits data between physical media access layer and media access control layer of the PCI Express. The PCI express interface of present invention enables physical coding sub-layer to be able to receive or output 8-bit data as well as to receive or output 16-bit data by adding an input interface unit and an output interface unit in physical coding sub-layer, thereby the data formats of physical coding sub-layer and media access control layer are compatible; enables the physical coding sub-layer to be able to handle data with sampling errors during transmission from physical media access layer to physical coding sub-layer by adding data adjustment unit in the physical coding sub-layer and applying corresponding signal processing method, thereby it ensures the integrity of the data transmitted over physical coding sub-layer.

40 Claims, 4 Drawing Sheets

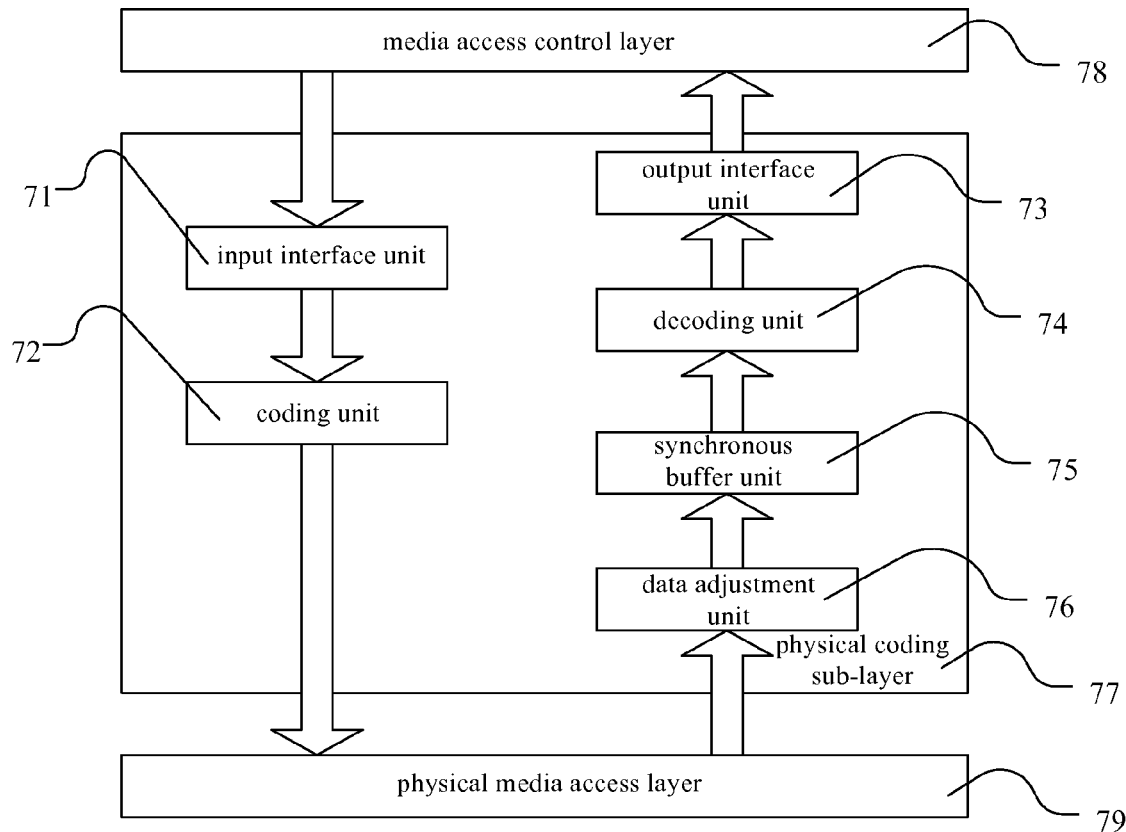

PERIPHERAL COMPONENT INTERCONNECT EXPRESS INTERFACE AND METHOD FOR SIGNAL PROCESSING

This application claims the priority of Chinese Patent Application No. 200610147794.X, filed Dec. 22, 2006, the entire disclosure of which is incorporated herein by reference.

FIELD OF THE INVENTION

The present invention relates to PCI (Peripheral Component Interconnect) Express interface, and particularly relates to the physical coding sub-layer that transmits data between physical media access layer and media access control layer of the PCI Express.

BACKGROUND OF THE INVENTION

PCI Express is an interconnection technology between chips and an interface technology for extending boards, which employs point-to-point serial interface between devices compared to traditional PCI and earlier shared parallel architectures of the computer bus. Thereby every device is allowed to have its own dedicated and exclusive connection, and needs not to request bandwidth from the whole bus, in addition, by using the connecting characteristics of the serial interface, data transmission speed can be easily increased to a very high frequency which is far more high than the transmission speed of the PCI bus. An individual fundamental PCI express link is a kind of dual simplex link, and a single fundamental PCI express serial interface has two independent links, implemented by different low-voltage to driven signals, consisting of a receive pair and a transmit pair (four lanes). It will not cause conflict with for example USB 2.0, InfiniBand, Ethernet and IEEE 1394/1394b. Therefore, the transmission speed of PCI Express interface is faster than traditional PCI interface, and the PCI Express interface has advantages of such as high-speed serial point-to-point transmission between devices, flexible adjustable bus bandwidth, and the like.

PCI Express consists of four protocol layers: Application Layer, Transaction Layer, Data Link Layer and Physical Layer. And physical layer can be further divided into media access control layer, physical coding sub-layer and physical media access layer.

A PCI Express interface was disclosed in Intel PIPE Macro Rev 1.00 Jun. 19, 2003. The physical coding sub-layer of the PCI express interface is used for implementing data transmission, signal control and error detection to ensure the integrity of transmitted data between physical media access layer and media access control layer.

But the technology of the prior art has defects:

As known from the description of the physical coding sub-layer structure, the physical coding sub-layer can only receive 8-bits input data, but the data inputted to physical coding sub-layer from media access control layer may be 16-bits as well as 8-bits, therefore the data format of physical coding sub-layer in the prior art is not compatible with that of media access control layer.

Because sampling errors may occur in the data transmitted from physical media access layer to physical coding sub-layer, but in the description about the structure of physical coding sub-layer in the prior art, there is no component for detection and processing cases of data sampling error, therefore, in prior art, there is high a possibility to transmit wrong data in the physical coding sub-layer.

DISCLOSURE OF THE INVENTION

One object of the present invention is to solve the problem that, in prior art, the data formats of physical coding sub-layer and media access control layer are not compatible.

Another object of the present invention is to solve the problem that, in prior art, the physical coding sub-layer does not have the component that can detect and handle the data sampling error situation.

In order to solve aforementioned problems, the present invention provides a PCI express interface, including a down data channel for transmitting data from media access control layer to physical media access layer via physical coding sub-layer, wherein the down data channel comprises:

Input interface unit for sampling with the clock of corresponding frequency according to the bit number of received data that transmitted from the media access control layer to the physical coding sub-layer, converting the data in the data format of media access control layer to the data to be coded conforming to the data format of physical coding sub-layer, and sampling the received data polarity control signal which controls data polarity and data identity signal which indicates transmission type under the clock of physical coding sub-layer and outputting;

Coding unit for receiving the data to be coded, data identity signal and data polarity control signal outputted from the input interface unit and the data polarity signal which is provided by the physical coding sub-layer indicating the data polarity, coding the data to be coded according to the data polarity signal after controlled by the data polarity control signal, and determining whether to transmit the coded data to the physical media access layer according to the data identity signal.

The present invention also provides a signal processing method of PCI express interface, including methods for transmitting down data from media access control layer to physical media access layer via physical coding sub-layer, wherein the said method of transmitting down data comprises:

Sampling with the clock of corresponding frequency according to the bit number of the received data that transmitted from the media access control layer to the physical coding sub-layer;

Converting the data in the data format of media access control layer into the data to be coded conforming to the data format of physical coding sub-layer, and sampling the received data polarity control signal which controls the data polarity and the data identity signal which indicates transmission type under the clock of physical coding sub-layer and outputting;

Receiving the data to be coded, data identity signal, data polarity controlling signal and data polarity signal provided by physical coding sub-layer indicating the data polarity, coding the data to be coded according to the data polarity control signal after controlled by data polarity control signal, and determining whether to transmit the coded data to physical media access layer according to the data identity signal.

The present invention also provides a PCI express interface, including up data channel for transmitting data from physical media access layer to media access control layer via physical coding sub-layer, wherein the up data channel comprises:

Synchronous buffer unit for receiving data transmitted over the physical media access layer and the data locking signal which indicates if the data is valid, determining if the received data is to be synchronized with the data to be coded that can be sampled correctly under the clock frequency of physical coding sub-layer according to the data locking signal, and outputting the data to be coded, buffer status signal and the data validity signal which indicates if the data has been synchronized;

Decoding unit for receiving the data to be decoded and data validity signal, determining whether to decode the data to be decoded according to the data validity signal, and outputting the decoded data, the decoding status signal and the data polarity comparison signal;

Output interface unit for sampling using clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type and outputting to media access control layer, and setting corresponding data transmission status signal according to received decoding status signal, data polarity comparison signal and buffer status signal and transmitting it to media access control layer.

The present invention also provides a signal processing method of PCI express interface, including a method for transmitting up data from physical media access layer to media access control layer via physical coding sub-layer, wherein the method of transmitting up data comprises:

Receiving data transmitted over physical media access layer and the data locking signal which indicates if the data is valid, determining if the received data is to be synchronized to the data to be decoded that can be sampled correctly under the clock frequency of physical coding sub-layer according to the data locking signal, and outputting the data to be decoded, buffer status signal and data validity signal which indicates if the data has been synchronized;

Receiving the data to be decoded and the data validity signal, determining whether to decode the data to be decoded according to the data validity signal, and outputting the decoded data, decoding status signal and data polarity comparison signal;

Sampling with the clock of corresponding frequency according to the bit number of the received decoded data, converting the data in the data format of physical coding sub-layer into the data conforming to the data format of media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer.

The present invention also provides a signal processing method of PCI express interface, including an up data channel for transmitting data from physical media access layer to media access control layer via physical coding sub-layer, wherein the up data channel comprises:

Data adjustment unit for receiving data transmitted from physical media access layer to physical coding sub-layer, the complement control signal which indicates whether to make complement operation and the data locking signal which indicates if the data is valid, determining whether to startup according to the data locking signal and whether to make complement operation according to the complement control signal, adjusting the data transmitted over the physical media access layer and showing sampling error, and outputting the adjusted data and alignment identity validity signal which indicates if the data has been adjusted;

Synchronous buffer unit for receiving the adjusted data and alignment identity validity signal, determining if the received adjusted data is to be synchronized with the data to be decoded that can be sampled correctly under the clock frequency of physical coding sub-layer according to the alignment identity validity signal, and outputting the data to be decoded and data validity signal which indicates if the data has been synchronized, and transmitting buffer status signal to media access control layer;

Decoding unit for receiving the data to be decoded and the data validity signal, determining whether to decode the data to be decoded according to the data validity signal, and outputting the decoded data, decoding status signal and data polarity comparison signal to media access control layer.

The present invention also provides a signal processing method of PCI express interface, including a method of transmitting up data from physical media access layer to media access control layer via physical coding sub-layer, wherein the method of transmitting up data comprises:

Receiving the data, complement control signal which indicates whether to make complement operation and data locking signal which indicates if the data is valid, which are transmitted from physical media access layer to physical coding sub-layer, determining whether to startup according to the data locking signal and whether to make complement operation according to the complement control signal, adjusting the data transmitted over physical media access layer and showing sampling error, and outputting the adjusted data and alignment identity validity signal which indicates if the data has been adjusted;

Receiving the adjusted data and alignment identity validity signal, determining if the received adjusted data is to be synchronized into the data to be decoded that can be sampled correctly under the clock frequency of physical coding sub-layer according to the alignment identity validity signal, and outputting the data to be decoded and data validity signal which indicates if the data has been synchronized, and transmitting buffer status signal to media access control layer;

Receiving the data to be decoded and the data validity signal, determining whether to decode the data to be decoded according to the data validity signal, and outputting the decoded data, decoding status signal and data polarity comparison signal to media access control layer.

The present invention also provides a PCI express interface, including an up data channel for transmitting data from physical media access layer to media access control layer via physical coding sub-layer, wherein the up data channel comprises:

Data adjustment unit for receiving the data, complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, and adjusting the data transmitted over physical media access layer and showing sampling error, and outputting the adjusted data and alignment identity validity signal which indicates if the data has been adjusted;

Synchronous buffer unit for receiving the adjusted data and alignment identity validity signal, determining if the received adjusted data is to be synchronized into the data to be decoded that can be sampled correctly under the clock frequency of physical coding sub-layer according to the alignment identity validity signal, and outputting the data to be decoded, buffer status signal and data validity signal which indicates if the data has been synchronized;

Decoding unit for receiving the data to be decoded and data validity signal, determining whether to decode the data to be decoded according to the data validity signal, and outputting the decoded data, decoding status signal and the data polarity comparison signal;

Output interface unit for sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer.

The present invention also provides a signal processing method of PCI express interface, including a method of transmitting up data from physical media access layer to media access control layer via physical coding sub-layer, wherein the method of transmitting up data comprises:

Receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data transmitted over physical media access layer and showing sampling error, and outputting the adjusted data and alignment identity validity signal which indicates if the data has been adjusted;

Receiving the adjusted data and alignment identity validity signal, determining if the received adjusted data is to be synchronized into the data to be decoded that can be sampled correctly under the clock frequency of physical coding sub-layer according to the alignment identity validity signal, and outputting the data to be decoded, the buffer status signal and the data validity signal which indicates if the data has been synchronized;

Receiving the data to be decoded and data validity signal, determining whether to decode the data to be decoded according to the data validity signal, and outputting the decoded data, decoding status signal and data polarity comparison signal;

Sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer.

The present invention also provides a PCI express interface, including physical coding sub-layer and a down data channel for transmitting data from media access control layer to physical media access layer via physical coding sub-layer and an up data channel for transmitting data from physical media access layer to media access control layer via physical coding sub-layer in the physical coding sub-layer, wherein the physical coding sub-layer comprises:

Input interface unit of down data channel for sampling with the clock of corresponding frequency according to the bit number of the received data that transmitted from media access control layer to physical coding sub-layer, converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

Coding unit of down data channel for receiving the data to be coded, data identity signal, data polarity control signal, which are outputted from the input interface unit, and the data polarity signal which is provided by physical coding sub-layer indicating the data polarity, coding the data to be coded according to the data polarity signal after controlled by the data polarity control signal, and determining whether to transmit the coded data to physical media access layer according to the data identity signal;

Data adjustment unit of up data channel for receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data transmitted over physical media access layer and showing sampling error, and outputting the adjusted data and alignment identity validity signal which indicates if the data has been adjusted;

Synchronous buffer unit of up data channel for receiving the adjusted data and alignment identity validity signal, determining if the received adjusted data is to be synchronized into the data to be decoded that can be sampled correctly under the clock frequency of physical coding sub-layer according to the alignment identity validity signal, and outputting the data to be decoded and the data validity signal which indicates if the data has been synchronized and transmitting buffer status signal to media access control layer;

Decoding unit of up data channel for receiving the data to be decoded and data validity signal, determining whether to decode the data to be decoded according to the data validity signal, outputting the decoded data, decoding status signal and the data polarity comparison signal and transmitting them to media access control layer.

The present invention also provides a signal processing method of PCI express interface, including a method of transmitting down data from media access control layer to physical media access layer via physical coding sub-layer and a method of transmitting up data from physical media access layer to media access control layer via physical coding sub-layer, wherein the methods of transmitting down data and up data include:

Sampling with the clock of corresponding frequency according to the bit number of the received data that transmitted from media access control layer to physical coding sub-layer;

Converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

Receiving the data to be coded, data identity signal, data polarity control signal and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

Receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data transmitted over physical media access layer and showing sampling error, and outputting the adjusted data and alignment identity validity signal which indicates if the data has been adjusted;

Receiving the adjusted data and alignment identity validity signal, determining if the received adjusted data is to be synchronized into the data to be decoded that can be sampled correctly under the clock frequency of physical coding sub-layer according to the alignment identity validity signal, and outputting the data to be decoded and data validity signal that indicates whether the data has been synchronized, and transmitting buffer status signal to media access control layer;

Receiving the data to be decoded and the data validity signal, determining whether to decode the data to be decoded according to the data validity signal, outputting the decoded data, decoding status signal and data polarity comparison signal and transmitting them to media access control layer.

The present invention also provides a PCI express interface, including physical coding sub-layer and a down data channel for transmitting data from media access control layer to physical media access layer via physical coding sub-layer and an up data channel for transmitting data from physical media access layer to media access control layer via physical coding sub-layer in the physical coding sub-layer, wherein the physical coding sub-layer comprises:

Input interface unit of down data channel for sampling with the clock of corresponding frequency according to the bit number of the received data that transmitted from media access control layer to physical coding sub-layer, converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

Coding unit of down data channel for receiving the data to be coded, data identity signal and data polarity control signal outputted from the input interface unit and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

Synchronous buffer unit of up data channel for Receiving data transmitted over physical media access layer and the data locking signal which indicates if the data is valid, determining if the received data is to be synchronized into the data to be decoded that can be sampled correctly under the clock frequency of physical coding sub-layer according to the data locking signal, and outputting the data to be decoded, buffer status signal and data validity signal that indicates if data has been synchronized;

Decoding unit of up data channel for receiving the data to be decoded and the data validity signal, determining whether to decode the data to be decoded according to the data validity signal, and outputting the decoded data, decoding status signal and the data polarity comparison signal;

Output interface unit of up data channel for sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer.

The present invention also provides a signal processing method of PCI express interface, including a method of transmitting down data from media access control layer to physical media access layer via physical coding sub-layer and a method of transmitting up data from physical media access layer to media access control layer via physical coding sub-layer, wherein the methods of transmitting down data and up data include:

Sampling with the clock of corresponding frequency according to the bit number of the received data that transmitted from media access control layer to physical coding sub-layer;

Converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

Receiving the data to be coded, data identity signal, data polarity control signal and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

Receiving data transmitted over physical media access layer and the data locking signal which indicates if the data is valid, determining if the received data is to be synchronized into the data to be decoded that can be sampled correctly under the clock frequency of physical coding sub-layer according to the data locking signal, and outputting the data to be decoded, buffer status signal and data validity signal which indicates if the data has been synchronized;

Receiving the data to be decoded and the data validity signal, determining whether to decode the data to be decoded according to the data validity signal, and outputting the decoded data, decoding status signal and the data polarity comparison signal;

Sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer.

The present invention also provides a PCI express interface, including physical coding sub-layer and a down data channel for transmitting data from media access control layer to physical media access layer via physical coding sub-layer and an up data channel for transmitting data from physical media access layer to media access control layer via physical coding sub-layer in the physical coding sub-layer, wherein the physical coding sub-layer comprises:

Input interface unit of down data channel for sampling with the clock of corresponding frequency according to the bit number of the received data that transmitted from media access control layer to physical coding sub-layer, converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

Coding unit of down data channel for receiving the data to be coded, data identity signal and data polarity control signal outputted from input interface unit and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

Data adjustment unit of up data channel for receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data transmitted over physical media access layer and showing sampling error, and outputting the adjusted data and alignment identity validity signal which indicates if the data has been adjusted;

Synchronous buffer unit of up data channel for receiving the data and the alignment identity validity signal, determining if the received adjusted data is to be synchronized into the data to be decoded that can be sampled correctly under the clock frequency of physical coding sub-layer according to the alignment identity validity signal, and outputting the data to be decoded, buffer status signal and data validity signal which indicates if the data has been synchronized;

Decoding unit of up data channel for receiving the data to be decoded and the data validity signal, determining whether to decode the data to be decoded according to the data validity signal, and outputting the decoded data, decoding status signal and the data polarity comparison signal;

Output interface unit of up data channel for sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer.

The present invention also provides a signal processing method of PCI express interface, including a method of transmitting down data from media access control layer to physical media access layer via physical coding sub-layer and a method of transmitting up data from physical media access layer to media access control layer via physical coding sub-layer, wherein the methods of transmitting down data and up data include:

Sampling with the clock of corresponding frequency according to the bit number of the received data that transmitted from media access control layer to physical coding sub-layer;

Converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

Receiving the data to be coded, data identity signal and data polarity control signal and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

Receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data transmitted over physical media access layer and showing sampling error, and outputting the adjusted data and alignment identity validity signal which indicates if the data has been adjusted;

Receiving the adjusted data and the alignment identity validity signal, determining if the received adjusted data is to be synchronized into the data to be decoded that can be sampled correctly under the clock frequency of physical coding sub-layer according to the alignment identity validity signal, and outputting the data to be decoded, buffer status signal and data validity signal which indicates if the data has been synchronized;

Receiving the data to be decoded and the data validity signal, determining whether to decode the data to be decoded according to the data validity signal, and outputting the decoded data, decoding status signal and the data polarity comparison signal;

Sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer.

Compare with the prior art, the PCI express interface of the present invention has the following advantages:

The PCI express interface of the present invention adds an input interface unit and output interface unit in the physical coding sub-layer so that the physical coding sub-layer can receive or output 8-bit data as well as 16-bit data, therefore it extents the scope of the application of the physical coding sub-layer;

The PCI express interface of the present invention adds data adjustment unit to detect and process the data with sampling errors in physical coding sub-layer, therefore it ensures the integrity of the data transmitted in physical coding sub-layer.

DESCRIPTION OF THE DRAWINGS

FIG. 7 is a schematic diagram of still another physical coding sub-layer of the PCI express interface of the present invention;

FIG. 8 is a testing mode schematic diagram of the PCI express interface of the present invention;

DETAILED DESCRIPTION

The PCI express interface of the present invention enables physical coding sub-layer to be able to receive and output 8-bit data as well as to receive and output 16-bit data by adding an input interface unit and output interface unit in the physical coding sub-layer.

The PCI express interface of the present invention enables physical coding sub-layer to be able to detect and handle data with sampling errors by adding data adjustment unit in the physical coding sub-layer.

Figure 1:
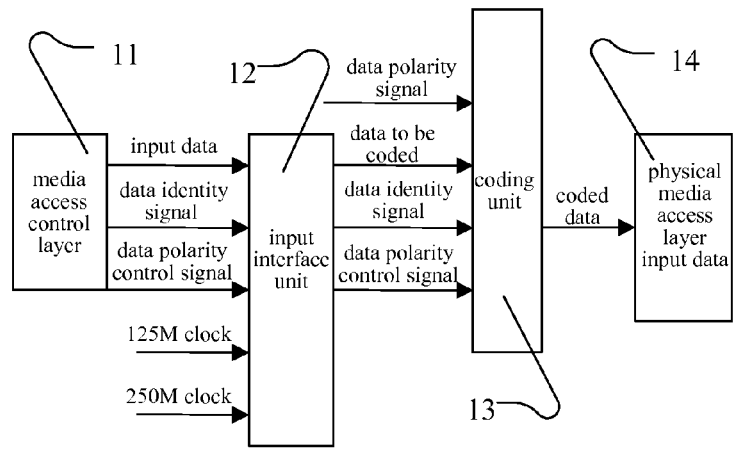
FIG. 1 is a schematic diagram of a down data channel of the physical coding sub-layer of the PCI express interface of the present invention.

FIG. 1 shows an embodiment of down data channel of the physical coding sub-layer of the PCI express interface of the present invention, wherein the down data channel comprises:

Input interface unit 12 for sampling with the clock of corresponding frequency according to the bit number of received data that is transmitted from media access control layer 11 to physical coding sub-layer (not shown), converting the data in the data format of media access control layer 11 into the data to be coded in the data format conforming to physical coding sub-layer, wherein when the bit number of received data is of 8 bits, said input interface unit uses the clock of 125 MHz to sample the data and output, while when the bit number of received data is of 16 bits, it uses the clock of 250 MHz to sample the data and output. Input interface unit 12, which samples the received data polarity control signal compliance that controls data polarity and data identity signal Data_k that indicates transmission type and outputs.

Coding unit 13 for receiving the data to be coded, data identity signal and data polarity control signal outputted from input interface unit 12 and the data polarity signal Disparity which is provided by physical coding sub-layer indicating the data polarity, as shown in FIG. 8, when the data polarity control signal is "0", it means the testing mode is not turned on and the data polarity signal is kept unchanged; when the data polarity control signal is "1", it means the testing mode is turned on, and the data polarity signal becomes negative. The coding unit employs different coding manner to code the data to be coded according to the difference of the data polarity signal and outputs the coded data to physical media access layer, for example, as shown in the black box of the coding manner table below,

| identity signal sequence | input data (bits 8-6) | input data (bits 5-1) | coding result when current polarity is negative | coding result when current polarity is positive | next polarity operation |
|---|---|---|---|---|---|
| k28.0 | 000_ | _00111 | 001111_0100 | 110000_1011 | keep |
| k28.1 | 001_ | _00111 | 001111_1001 | 110000_0110 | reverse |
| k28.2 | 010_ | _00111 | 001111_0101 | 110000_1010 | reverse |
| k28.3 | 011_ | _00111 | 001111_0011 | 110000_1100 | reverse |
| k28.4 | 100_ | _00111 | 001111_0010 | 110000_1101 | keep |
| k28.5 | 101_ | _00111 | 001111_1010 | 110000_0101 | reverse |
| k28.6 | 110_ | _00111 | 001111_0110 | 110000_1001 | reverse |
| k28.7 | 111_ | _00111 | 001111_1000 | 110000_0111 | keep |
| k23.7 | 111_ | _11101 | 111010_1000 | 000101_0111 | keep |
| k27.7 | 111_ | _11011 | 110110_1000 | 001001_0111 | keep |
| k29.7 | 111_ | _10111 | 101110_1000 | 010001_0111 | keep |
| K30.7 | 111_ | _01111 | 011110_1000 | 100001_0111 | keep |

The coding unit 13 receives an identity signal BC, i.e. k28.5, whose polarity is positive, then according to the coding manner of positive polarity, the coding result to BC is 283, i.e. 110000_0101, while according to coding rule that defined in the coding table, the polarity should be turn over in the next coding, that is, coding in the manner of negative polarity, therefore the coding result to the next identity signal BC is 17C, i.e. 001111_1010.

The coding unit 13 determines whether to transmit the coded data to physical media access layer 14 according to the data identity signal, which is a 2-bit data, and when the data bit value is "1, it means the transmission of symbol identity; when the data bit value is "0", it means the transmission of data. Wherein said symbol identity comprises alignment identity and offset Instruction.

The data transmission method corresponding to down data channel described above is given below, which comprises steps:

First, the input interface unit 12 samples with the clock of corresponding frequency according to the bit number of the received data that is transmitted from media access control layer 11 to physical coding sub-layer;

Then the input interface unit 12 converts the data in the data format of media access control layer 11 into data to be coded in the data format conforming to physical coding sub-layer, and samples the received data polarity control signal which controls data polarity and data identity signal which indicates transmission type under the clock of physical coding sub-layer and outputs;

Then the coding unit 13 receives the data to be coded, data identity signal, data polarity control signal and data polarity signal provided by physical coding sub-layer indicating data polarity, codes the data to be coded according to data polarity signal after controlled by data polarity control signal, and determines whether to transmit the coded data to physical media access layer 14 according to data identity signal.

Two problems may occur in the process of transmitting up data from physical media access layer to physical coding sub-layer: 1. The physical media access layer transmits data to physical coding sub-layer in a fashion that it sends every time 10-bit data to physical coding sub-layer, but in this process, sampling error may occur in transmitted data due to the miss-alignment of the data bit. 2. Although the clock frequency of the physical coding sub-layer is the same as that of the physical media access layer, in reality, the leading edge of the clock of the physical coding sub-layer is a little bit earlier than that of the physical media access layer, and thus, errors may occur when the data, which transmitted from physical media access layer to physical coding sub-layer, is sampled under the clock frequency of the physical coding sub-layer.

Figure 2:
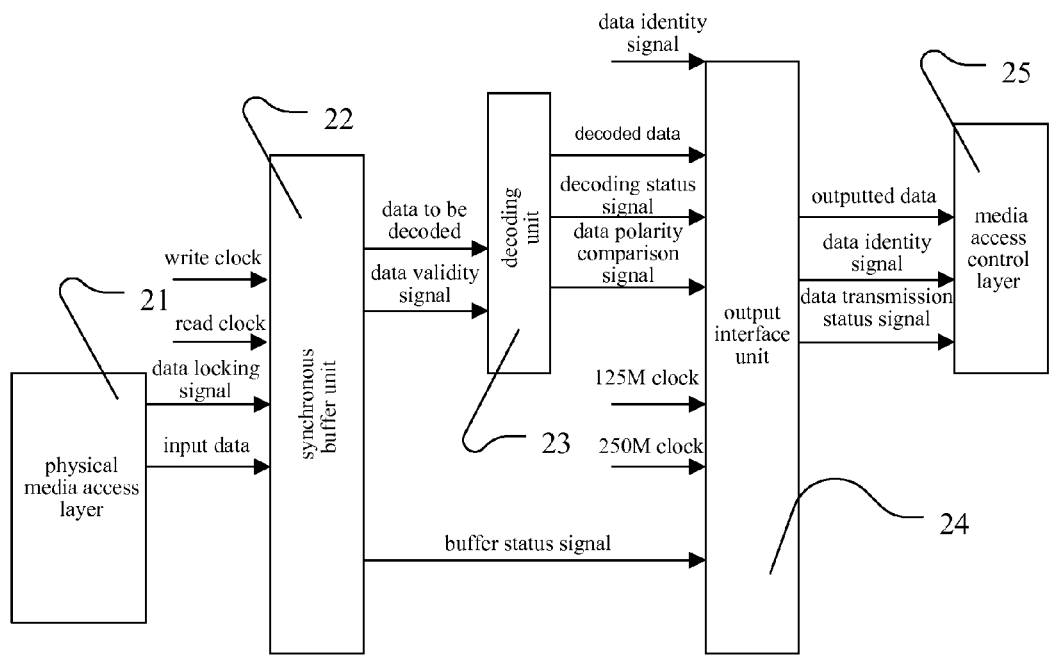
FIG. 2 is a schematic diagram of an up data channel of the physical coding sub-layer of the PCI express interface of the present invention.

FIG. 2 shows an embodiment of up data channel of the physical coding sub-layer of the PCI express interface of the present invention, wherein the up data channel comprises;

Synchronous buffer unit 22 for receiving data transmitted over physical media access layer 21 and the data locking signal which indicates if the data is valid, determining if the received data is to be synchronized into the data to be decoded, which can be sampled correctly under the clock frequency of physical coding sub-layer, (not shown) according to the data locking signal, and outputting the data to be decoded, buffer status signal and the data validity signal which indicates if the data has been synchronized;

Decoding unit 23 for receiving the data to be decoded and data validity signal, determining whether to decode the data to be decoded according to the data validity signal, and outputting the decoded data, decoding status signal and data polarity comparison signal;

Output interface unit 24 for sampling with the clock of corresponding frequency according to the bit number of the received decoded data, converting the data in the data format of physical coding sub-layer into the data in the data format conforming to media access control layer 25 and outputting to media access control layer 25, sampling the received data identity signal which, provided by physical coding sub-layer, indicates the transmission type under the clock frequency of media access control layer 25 and outputting to media access control layer 25, and setting corresponding data transmission status signal according to the received decoding status signal, data polarity comparison signal and buffer status signal and transmitting it to media access control layer.

The data transmission method corresponding to up data channel described above is given below, which comprises steps:

Receiving the data and the data locking signal which indicates if the data is valid transmitted from physical media access layer 21, determining if the received data is to be synchronized into the data to be decoded that can be sampled correctly under the clock frequency of physical coding sub-layer according to the data locking signal, and outputting the data to be decoded, buffer status signal and the data validity signal which indicates if the data has been synchronized;

Receiving the data to be decoded and data validity signal, determining whether to decode the data to be decoded according to the data validity signal, and outputting the decoded data, decoding status signal and data polarity comparison signal;

Sampling with the clock of corresponding frequency according to the bit number of the received decoded data, converting the data in the data format of physical coding sub-layer into the data in the data format conforming to media access control layer 25 and outputting to media access control layer 25, sampling the received data identity signal which, provided by physical coding sub-layer, indicates the transmission type under the clock frequency of media access control layer 25 and outputting to media access control layer 25, and setting corresponding data transmission status signal according to the received decoding status signal, data polarity comparison signal and buffer status signal and transmitting to media access control layer 25.

Figure 3:
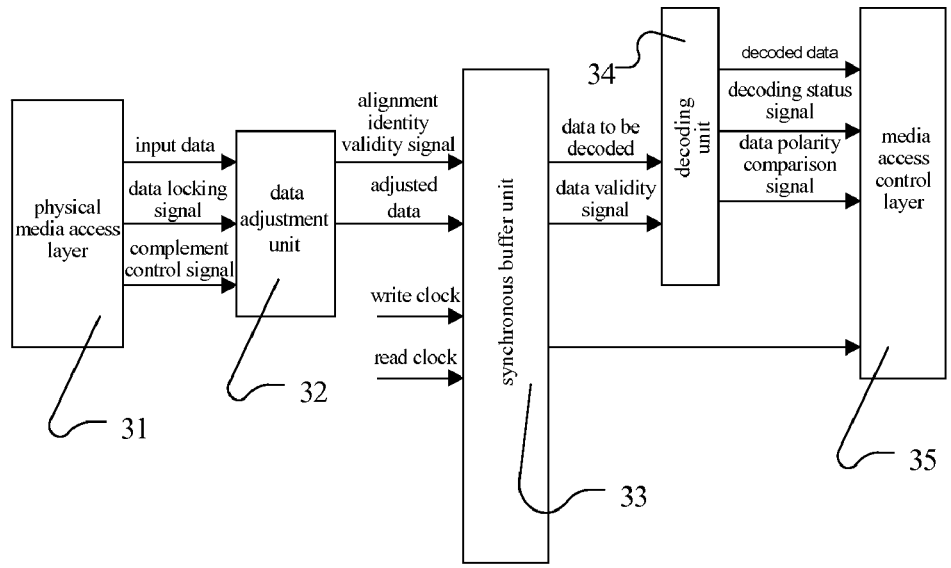
FIG. 3 is a schematic diagram of another up data channel of the physical coding sub-layer of the PCI express interface of the present invention.
Figure 4:
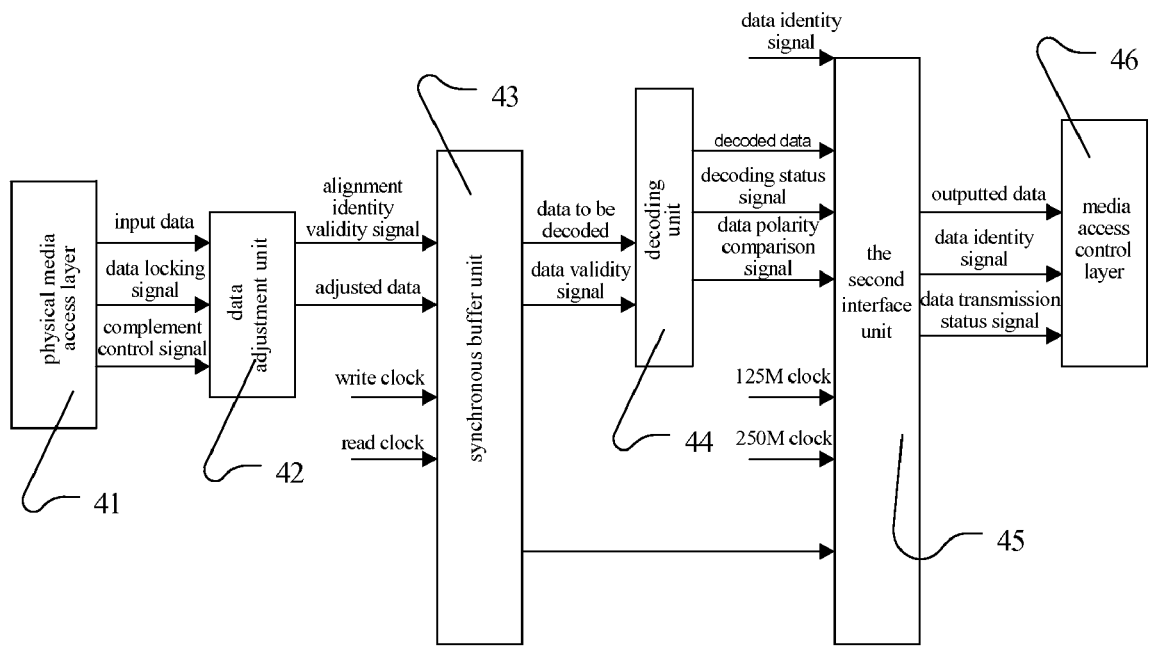
FIG. 4 is a schematic diagram of still another up data channel of the physical coding sub-layer of the PCI express interface of the present invention.

FIG. 3 shows another embodiment of up data channel of the physical coding sub-layer of the PCI express interface of the present invention, wherein the up data channel comprises;

Data adjustment unit 32 for receiving the data, the complement control signal which indicates whether to make complement operation and the data locking signal which indicates if the data is valid, which are transmitted from the physical media access layer 31 to physical coding sub-layer (not shown), determining whether to startup according to the data locking signal and whether to make complement operation according to the complement control signal, adjusting the data, which is transmitted in physical media access layer 31 and comes forth sampling error, and the data boundary according to the position of the alignment identity in the data, and outputting the adjusted data and alignment identity validity signal which indicates if the data has been adjusted;

Synchronous buffer unit 33 for receiving the adjusted data and alignment identity validity signal, determining if the received adjusted data is to be synchronized into the data to be decoded that can be sampled correctly under the clock frequency of physical coding sub-layer according to the alignment identity validity signal, outputting the data to be decoded and data validity signal which indicates if the data has been synchronized, and transmitting the buffer status signal to media access control layer;

Decoding unit 34 for receiving the data to be decoded and the data validity signal, determining whether to decode the data to be decoded according to the data validity signal, and outputting the decoded data, decoding status signal and the data polarity comparison signal and transmitting to media access control layer 35;

The data transmission method corresponding to the up data channel described above is given below, which comprises steps of:

Receiving the data, the complement control signal which indicates whether to make complement operation and the data locking signal which indicates if the data is valid, which are transmitted from the physical media access layer 31 to physical coding sub-layer, determining whether to startup according to the data locking signal and whether to make complement operation according to the complement control signal, adjusting the data, which is transmitted in physical media access layer 31 and comes forth sampling error, and outputting the adjusted data and alignment identity validity signal which indicates if the data has been adjusted;

Receiving the adjusted data and alignment identity validity signal, determining if the received adjusted data is to be synchronized into the data to be decoded that can be sampled correctly under the clock frequency of physical coding sub-layer according to the alignment identity validity signal, outputting the data to be decoded and data validity signal which indicates if the data has been synchronized, and transmitting the buffer status signal to media access control layer 35;

Receiving the data to be decoded and the data validity signal, determining whether to decode the data to be decoded according to the data validity signal, and outputting the decoded data, decoding status signal and the data polarity comparison signal and transmitting to media access control layer 35;

FIG. 4 shows still another embodiment of up data channel of the physical coding sub-layer of the PCI express interface of the present invention, wherein the up data channel comprises:

Data adjustment unit 42 for receiving the data, the complement control signal which indicates whether to make complement operation and the data locking signal which indicates if the data is valid, which are transmitted from physical media access layer 41 to physical coding sub-layer (not shown), determining whether to startup according to the data locking signal, wherein the data adjustment unit is in waiting status when the data locking signal is "0", while the data adjustment unit is startup when the data locking signal is "1". The data adjustment unit 42 determines whether to make complement operation according to the complement control signal, wherein the data adjustment unit 42 makes the complement operation to the received data in advance when the complement control signal is "1", and it does not make the complement operation to the received data when the complement control signal is "0". Further, the data adjustment unit 42 adjusts the data transmitted over physical media access layer 41 and showing sampling error, wherein the said adjustment refers to the adjustment to data boundary according to the position of the alignment identity COM in the data. The alignment identity COM is a special identity in the PCI express interface, and in the representation of 10-bit data of the PCI express interface, only the alignment identity allows 5 consecutive "1" or "0", in order to differentiate from other 10-bit input data. The alignment identity of the PCI express interface of present invention is "0011111010", and once the boundary of the alignment identity is detected by the data adjustment unit 42, the boundaries of other 10-bit input data will be calibrated strictly on the basis of per 10 bits. Hereinafter, a detailed example is given to illustrate how the data adjustment unit 42 adjusts the data with sampled error:

In normal situation, as described above, the transmission fashion from physical media access layer to physical coding sub-layer should be 10-bit data with the alignment identity in interval, as shown below:

| XXXXXXXXXX | 0011111010 | XXXXXXXXXX |
|---|---|---|
| The first data | | The second data |

But when the sampling errors occur, the received data may become to:

| XXXXX00111 | 11010XXXXX | XXXXX |
|---|---|---|
| The first data | The second data | |

That is, the first 10-bit data and the second 10-bit data that sampled become different than they were outputted from physical media access layer, thus it may cause data transmission errors.

The adjustment operations of the data adjustment unit 42 are as follows: the data adjustment unit 42 detects the alignment identity COM, which is "0011111010", in the received data, when the alignment identity is found, the data adjustment unit 42 will lock the 10-bit data where the alignment identity is located, then divide the data before and after the alignment identity on the basis of per 10-bit, and as such the transmitted data can be recovered to original state, after that, the data adjustment unit 42 may output the adjusted data and send the alignment identity validity signal lck_align.

Synchronous buffer unit 43 for receiving the adjusted data and alignment identity validity signal, determining if the received adjusted data is to be synchronized into the data to be decoded that can be sampled correctly under the clock frequency of physical coding sub-layer according to the alignment identity validity signal, and solving the fore mentioned problem, where the data sampling errors were caused by the inconsistence of clocks' leading edges of physical media access layer and physical coding sub-layer, by the operations that synchronize data. For the synchronous buffer unit 43, the operation of receiving data is the write operation and is controlled by the writing clock of the synchronous buffer unit (the writing clock is kept consistent with the clock of the physical media access layer), and the operation of outputting data is read operation and is controlled by the read clock of the synchronous buffer unit (the read clock is kept consistent with the clock of the physical coding sub-layer). Therefore the synchronizing operation of the synchronous buffer unit 43 is to adjust the leading edge of the written adjusted data, which is controlled by the writing clock, to be consistent with the leading edge of the read clock through adjusting the offset instruction set contained in the data, so that the data error will not occur when reading the written adjusted data while the read clock rises. If the alignment identity validity signal is "0", the synchronous buffer unit 43 is in waiting state; if the alignment identity validity signal is "1", the synchronous buffer unit 43 starts to detect the offset instruction set contained in the adjusted data, and the offset instruction set whose initial value is "BC 1C 1C 1C" will have affect on the adjusted data received by synchronous buffer unit 43. When the synchronous buffer unit 43 detects the "BC 1C" from the offset instruction set, it starts to compare the leading edge difference between reading clock and writing clock, if the leading edge difference between reading clock and writing clock is greater than the defined value, then an offset instruction "1C" is added to offset instruction set, and the output interface unit 45 is notified of the change, while the offset instruction set became "BC 1C 1C 1C 1C", so that the leading edge of the written data controlled by writing clock is consistent with the lead edge of the reading clock; if the leading edge difference between reading clock and writing clock is smaller than the defined value, then an offset instruction "1C" is removed from offset instruction set, and the output interface unit 45 is notified of the change, while the offset instruction set became "BC 1C 1C 1C", so that the leading edge of the written data controlled by the writing clock is consistent with the lead edge of the reading clock. The synchronous buffer unit 43 can also detects own buffer status, and if the buffer status is fully written, then a buffer overflow signal is sent; if the buffer status is read empty, then a buffer underflow signal is sent. The synchronous buffer unit 43 correctly samples the received adjusted data when the local clock frequency, which is read clock frequency, of the physical coding sub-layer is rising, and outputs the data to be decoded and data receiving validity signal rx_valid.

Decoding unit 44 for receiving the data to be decoded and data validity signal, determining whether to decode the data to be decoded according to the data validity signal, and detecting if the received data to be decoded has alignment identity COM. If the data receiving validity signal is "0" or the received data to be decoded does not have alignment identity, then the decoding unit is in waiting state; if the data receiving validity signal is "1" and the received data to be decoded has alignment identity, then the decoding unit 44 will compare the received data to be decoded with the decoding table, which contains the corresponding decoding relationship between data to be decoded and decoded data in conditions of different data polarity. If the data to be decoded does not exist in the decoding table or the data polarity corresponding to data to be decoded does not exist in the decoding table, then the decoding unit 44 confirms that the data to be decoded can not be decoded correctly, sets the decoding status signal and data polarity comparison signal to "1" and sends out; if the data to be decoded or the corresponding data polarity exists in the decoding table, then the decoding unit 44 decodes the data to be decoded, outputs the decoded data, sets the decoding status signal and data polarity comparison signal to "0" and sends out.

Output interface unit 45 for sampling with the clock of corresponding frequency according to the bit number of the received decoded data, wherein when the bit number of the received decoded data is of 8 bits, the clock with 125 MHZ frequency is used to sample the data; when the bit number of the received data is of 16 bits, the clock with 250 MHZ frequency is used to sample the data, so as to convert the data in the data format of physical coding sub-layer into the data conforming to the data format of media access control layer, output to media access control layer 46, and sample the received data identity signal which, provided by physical coding sub-layer, indicates the transmission type and output to media access control layer 46, where the data identity signal is 2-bit data, and it represents to transmit the symbol identity which comprises the alignment identity and offset instruction when the data bit value is "1"; it represents to transmit the data when the data bit value is "0". Further, the output interface unit 45 sets corresponding data transmission status signal according to the received decoding status signal, data polarity comparison signal and buffer status signal and transmits to media access control layer 46, when the received decoding status signal and data polarity comparison signal are "0" and no buffer status signal is received and no change notification of the offset instruction set issued from the synchronous buffer unit 43 is acquired, it represents the data received successfully, and the data transmission status signal is set to "000" and transmitted to media access control layer 46; when the notification, which is issued from synchronous buffer unit 43, of adding an offset instruction to the offset instruction set is acquired, the data transmission status signal is set to "001" and transmitted to media access control layer 46; when the notification, which is issued from synchronous buffer unit 43, of removing an offset instruction from the offset instruction set is acquired, the data transmission status signal is set to "010" and transmitted to media access control layer 46; when the data transmission is paused and the physical coding sub-layer is in the state of detecting data, the data transmission status signal is set to "011" and transmitted to media access control layer 46; when the message, which is issued from decoding unit 44, that the data to be decoded does not exist in the decoding table and thus can not be correctly decoded is acquired, i.e. when the decoding status signal is "1", the data transmission status signal is set to "100" and transmitted to media access control layer 46; when the buffer overflow signal issued from synchronous buffer unit 43 is acquired, the data transmission status signal is set to "101" and transmitted to media access control layer 46; when the buffer underflow signal issued from synchronous buffer unit 43 is acquired, the data transmission status signal is set to "110" and transmitted to media access control layer 46; when the message, which is issued from decoding unit 44, that the data polarity corresponding to the data to be decoded does not exist in the decoding table and thus the decoding can not be done correctly is acquired, i.e. when the data polarity comparison signal is "1", the data transmission status signal is set to "111" and transmitted to media access control layer 46.

Figure 5:
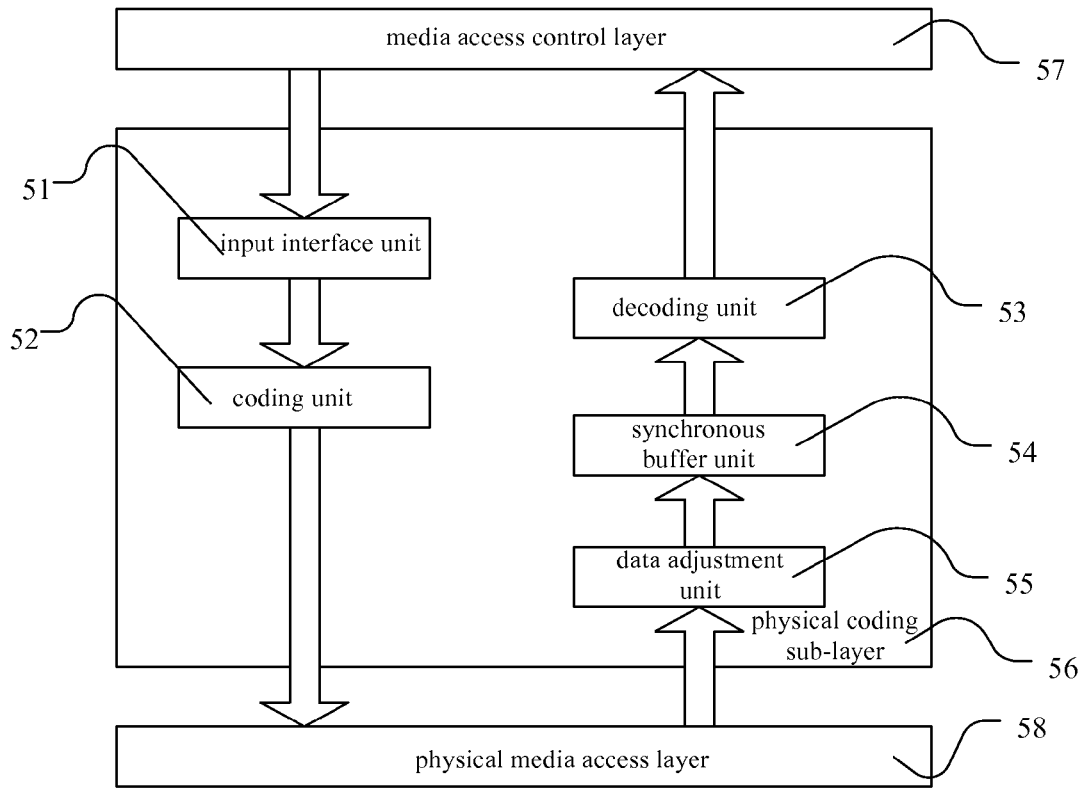
FIG. 5 is a schematic diagram of a physical coding sub-layer of the PCI express interface of the present invention.

The data transmission method corresponding to the aforementioned up data channel, which comprises the steps of:

Receiving the data, the complement control signal which indicates whether to make complement operation and the data locking signal which indicates if the data is valid, which are transmitted from the physical media access layer 41 to physical coding sub-layer, determining whether to startup according to the data locking signal and whether to make complement operation according to the complement control signal, adjusting the data, which is transmitted in physical media access layer and comes forth sampling error, and outputting the adjusted data and alignment identity validity signal which indicates if the data has been adjusted;

Receiving the adjusted data and alignment identity validity signal, determining if the received adjusted data is to be synchronized into the data to be decoded that can be sampled correctly under the clock frequency of physical coding sub-layer according to the alignment identity validity signal, outputting the data to be decoded, the buffer status signal and data validity signal which indicates if the data has been synchronized;

Receiving the data to be decoded and the data validity signal, determining whether to decode the data to be decoded according to the data validity signal, and outputting the decoded data, decoding status signal and the data polarity comparison signal;

Sampling with the clock of corresponding frequency according to the bit number of the received data, converting the data in the data format of physical coding sub-layer into the data in the data format conforming to media access control layer 46, and outputting to the media access control layer 46, and sampling the received data identity signal which indicates transmission type provided by the physical coding sub-layer under the clock of media access control layer 46 and outputting to the media access control layer 46, and setting corresponding data transmission status signal according to received decoding status signal, data polarity comparison signal, and buffer status signal, and transmitting to the media access control layer 46;

FIG. 5 shows an embodiment of the physical coding sub-layer and the down data channel for transmitting data from media access control layer to physical media access layer via physical coding sub-layer, and up data channel for transmitting data from physical media access layer to media access control layer via physical coding sub-layer, in the physical coding sub-layer of the PCI express interface of the present invention, wherein the physical coding sub-layer comprises:

Input interface unit 51 of down data channel for sampling with the clock of corresponding frequency according to the bit number of the received data that transmitted from media access control layer 57 to physical coding sub-layer 56, converting the data in the data format of media access control layer 57 into the data to be coded in the data format conforming to physical coding sub-layer 56, and sampling the received data polarity control signal which controls data polarity and data identity signal which indicates transmission type under the clock of physical coding sub-layer and outputting;

Coding unit 52 of down data channel for receiving the data to be coded, data identity signal, data polarity control signal that are outputted from the input interface unit 51 and the data polarity signal provided by physical coding sub-layer 56 indicating the data polarity, coding the data to be coded according to the data polarity signal after controlled by the data polarity control signal, and determining whether to transmit the coded data to physical media access layer 58 according to data identity signal;

Data adjustment unit 55 of up data channel for receiving the data, the complement control signal which indicates whether to make complement operation and the data locking signal which indicates if the data is valid, which are transmitted from physical media access layer 58 to physical coding sub-layer 56, determining whether to startup according to the data locking signal and whether to make complement operation according to the complement control signal, and adjusting the data transmitted over physical media access layer 58 and showing sampling error, and outputting the adjusted data and alignment identity validity signal which indicates if the data has been adjusted;

Synchronous buffer unit 54 of up data channel for receiving the adjusted data and alignment identity validity signal, determining if the received adjusted data is to be synchronized into the data to be decoded, which can be sampled correctly under the clock frequency of physical coding sub-layer 56 according to the alignment identity validity signal, outputting the data to be decoded and the data validity signal indicating whether the data has been synchronized, and transmitting buffer status signal to media access control layer 57;

Decoding unit 53 of up data channel for receiving the data to be decoded and data validity signal, determining whether to decode the data to be decoded according to the data validity signal, outputting the decoded data, decoding status signal and data polarity comparison signal and transmitting them to media access control layer 57.

The data transmission method corresponding to the physical coding sub-layer described above is given below, which comprises steps of:

Sampling with the clock of corresponding frequency according to the bit number of the received data that transmitted from media access control layer 57 to physical coding sub-layer 56;

Converting the data in the data format of media access control layer 57 into the data to be coded in the data format conforming to physical coding sub-layer 56, and sampling the received data polarity control signal which controls data polarity and data identity signal which indicates transmission type under the clock of physical coding sub-layer 56 and outputting;

Receiving the data to be coded, data identity signal, data polarity control signal and the data polarity signal provided by physical coding sub-layer 56 indicating the data polarity, coding the data to be coded according to the data polarity signal after controlled by the data polarity control signal, and determining whether to transmit the coded data to physical media access layer 58 according to the data identity signal;

Receiving the data, the complement control signal which indicates whether to make complement operation and the data locking signal which indicates if the data is valid, which are transmitted from physical media access layer 58 to physical coding sub-layer 56, determining whether to startup according to the data locking signal and whether to make complement operation according to the complement control signal, adjusting the data transmitted over physical media access layer 58 and showing sampling error, and outputting the adjusted data and alignment identity validity signal which indicates if the data has been adjusted;

Receiving the adjusted data and alignment identity validity signal, determining if the received adjusted data is to be synchronized into the data to be decoded, which can be sampled correctly under the clock frequency of physical coding sub-layer 56 according to the alignment identity validity signal, outputting the data to be decoded and data validity signal that indicates whether the data has been synchronized, and transmitting buffer status signal to media access control layer 57;

Receiving the data to be decoded and the data validity signal, determining whether to decode the data to be decoded according to the data validity signal, outputting the decoded data, decoding status signal and data polarity comparison signal and transmitting them to media access control layer 57.

Figure 6:
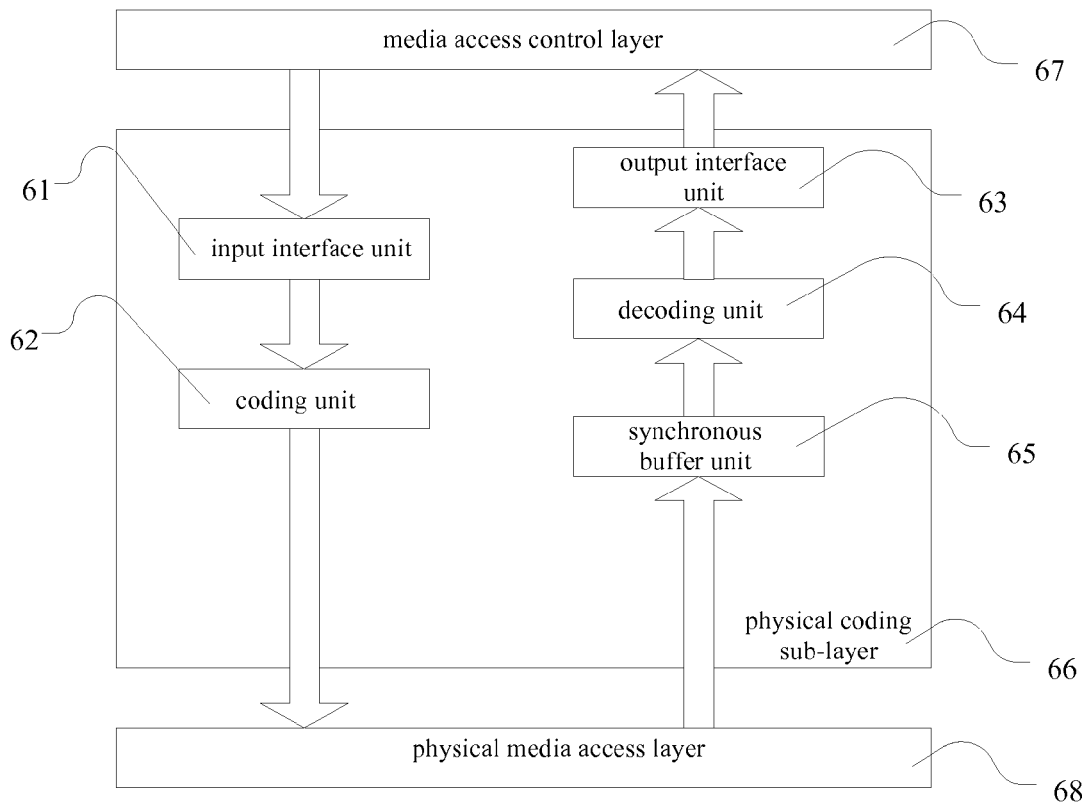
FIG. 6 is a schematic diagram of another physical coding sub-layer of the PCI express interface of the present invention.

FIG. 6 shows another embodiment of the physical coding sub-layer and the down data channel for transmitting data from media access control layer to physical media access layer via physical coding sub-layer, and up data channel for transmitting data from physical media access layer to media access control layer via physical coding sub-layer, in the physical coding sub-layer of the PCI express interface of the present invention, wherein the physical coding sub-layer comprises:

Input interface unit 61 of down data channel for sampling with the clock of corresponding frequency according to the bit number of the received data that transmitted from media access control layer 67 to physical coding sub-layer 66, converting the data in the data format of media access control layer 67 into the data to be coded in the data format conforming to physical coding sub-layer 66, and sampling the received data polarity control signal which controls data polarity and data identity signal which indicates transmission type under the clock of physical coding sub-layer 66 and outputting;

Coding unit 62 of down data channel for receiving the data to be coded, data identity signal and data polarity control signal outputted from input interface unit 61 and the data polarity signal provided by physical coding sub-layer 66 indicating the data polarity, coding the data to be coded according to the data polarity signal after controlled by the data polarity control signal, and determining whether to transmit the coded data to physical media access layer 68 according to the data identity signal;

Synchronous buffer unit 65 of up data channel for receiving data transmitted over physical media access layer 68 and the data locking signal which indicates if the data is valid, determining if the received data is to be synchronized into the data to be decoded, which can be sampled correctly under the clock frequency of physical coding sub-layer 66 according to the data locking signal, and outputting the data to be decoded, buffer status signal and data validity signal which indicates if the data has been synchronized;

Decoding unit 64 of up data channel for receiving the data to be decoded and the data validity signal, determining whether to decode the data to be decoded according to the data validity signal, and outputting the decoded data, decoding status signal and the data polarity comparison signal;

Output interface unit 63 of up data channel for sampling with the clock of corresponding frequency according to the bit number of the received decoded data, converting the data in the data format of physical coding sub-layer 66 into the data in the data format conforming to media access control layer 67 and outputting to media access control layer 67, sampling the received data identity signal which, provided by physical coding sub-layer 66, indicates the transmission type under the clock frequency of the media access control layer 67 and outputting to media access control layer 67, and setting corresponding data transmission status signal according to the received decoding status signal, data polarity comparison signal and buffer status signal and transmitting it to media access control layer 67.

The data transmission method corresponding to physical coding sub-layer described above is given below, which comprises steps of:

Sampling with the clock of corresponding frequency according to the bit number of the received data transmitted from media access control layer 67 to physical coding sub-layer 66;

Converting the data in the data format of media access control layer 67 into the data to be coded in the data format conforming to physical coding sub-layer 66, and sampling the received data polarity control signal which controls data polarity and data identity signal which indicates transmission type under the clock of physical coding sub-layer 66 and outputting;

Receiving the data to be coded, data identity signal, data polarity control signal and the data polarity signal provided by physical coding sub-layer 66 indicating the data polarity, coding the data to be coded according to the data polarity signal after controlled by the data polarity control signal, and determining whether to transmit the coded data to physical media access layer 68 according to the data identity signal;

Receiving data transmitted over physical media access layer 68 and the data locking signal which indicates if the data is valid, determining if the received data is to be synchronized into the data to be decoded, which can be sampled correctly under the clock frequency of physical coding sub-layer, 66 according to the data locking signal, and outputting the data to be decoded, buffer status signal and data validity signal which indicates if the data has been synchronized;

Receiving the data to be decoded and the data validity signal, determining whether to decode the data to be decoded according to the data validity signal, and outputting the decoded data, decoding status signal and the data polarity comparison signal;

Sampling with the clock of corresponding frequency according to the bit number of the received decoded data, converting the data in the data format of physical coding sub-layer 66 into the data in the data format conforming to media access control layer 67 and outputting to media access control layer, sampling the received data identity signal which, provided by the physical coding sub-layer, indicates the transmission type under the clock frequency of the media access control layer 67 and outputting to media access control layer 67, and setting corresponding data transmission status signal according to the received decoding status signal, data polarity comparison signal and buffer status signal and transmitting it to media access control layer 67.

FIG. 7 shows yet another embodiment of the physical coding sub-layer and the down data channel for transmitting data from media access control layer to physical media access layer via physical coding sub-layer, and up data channel for transmitting data from physical media access layer to media access control layer via physical coding sub-layer, in the physical coding sub-layer of the PCI express interface of the present invention, wherein the physical coding sub-layer comprises:

Input interface unit 71 of down data channel for sampling with the clock of corresponding frequency according to the bit number of the received data transmitted from media access control layer 78 to physical coding sub-layer 77, converting the data in the data format of media access control layer 78 into the data to be coded in the data format conforming to physical coding sub-layer 77, and sampling the received data polarity control signal which controls data polarity and data identity signal which indicates transmission type under the clock of physical coding sub-layer 77 and outputting;

Coding unit 72 of down data channel for receiving the data to be coded, data identity signal and data polarity control signal outputted from input interface unit 71 and the data polarity signal provided by physical coding sub-layer 77 indicating the data polarity, coding the data to be coded according to the data polarity signal after controlled by the data polarity control signal, and determining whether to transmit the coded data to physical media access layer 79 according to the data identity signal;

Data adjustment unit 76 of up data channel for receiving the data, the complement control signal which indicates whether to make complement operation and the data locking signal which indicates if the data is valid, which are transmitted from physical media access layer 79 to physical coding sub-layer 77, determining whether to startup according to the data locking signal and whether to make complement operation according to the complement control signal, adjusting the data transmitted over physical media access layer 79 and showing sampling error, and outputting the adjusted data and alignment identity validity signal which indicates if the data has been adjusted;

Synchronous buffer unit 75 of up data channel for receiving the data and the alignment identity validity signal, determining if the received adjusted data is to be synchronized into the data to be decoded, which can be sampled correctly under the clock frequency of physical coding sub-layer, 77 according to the alignment identity validity signal, and outputting the data to be decoded, buffer status signal and data validity signal which indicates if the data has been synchronized;

Decoding unit 74 of up data channel for receiving the data to be decoded and the data validity signal, determining whether to decode the data to be decoded according to the data validity signal, and outputting the decoded data, decoding status signal and the data polarity comparison signal;

Output interface unit 73 of up data channel for sampling with the clock of corresponding frequency according to the bit number of the received decoded data, converting the data in the data format of physical coding sub-layer 77 into the data in the data format conforming to media access control layer 78 and outputting to media access control layer 78, sampling the received data identity signal which, provided by physical coding sub-layer 77, indicates the transmission type under the clock frequency of media access control layer 78 and outputting to media access control layer 78, and setting corresponding data transmission status signal according to received decoding status signal, data polarity comparison signal and buffer status signal and transmitting it to media access control layer 78.

The data transmission method corresponding to physical coding sub-layer described above is given below, which comprises steps of:

Sampling with the clock of corresponding frequency according to the bit number of the received data that transmitted from media access control layer 78 to physical coding sub-layer 77;

Converting the data in the data format of media access control layer 78 into the data to be coded in the data format conforming to physical coding sub-layer 77, and sampling the received data polarity control signal which controls data polarity and data identity signal which indicates transmission type under the clock of physical coding sub-layer 77 and outputting;

Receiving the data to be coded, data identity signal and data polarity control signal and the data polarity signal provided by physical coding sub-layer 77 indicating the data polarity, coding the data to be coded according to the data polarity signal after controlled by the data polarity control signal, and determining whether to transmit the coded data to physical media access layer 79 according to the data identity signal;

Receiving the data, the complement control signal which indicates whether to make complement operation and the data locking signal which indicates if the data is valid, which are transmitted from physical media access layer 79 to physical coding sub-layer 77, determining whether to startup according to the data locking signal and whether to make complement operation according to the complement control signal, adjusting the data transmitted over physical media access layer 79 and showing sampling error, and outputting the adjusted data and alignment identity validity signal which indicates if the data has been adjusted;

Receiving the adjusted data and the alignment identity validity signal, determining if the received adjusted data is to be synchronized into the data to be decoded, which can be sampled correctly under the clock frequency of physical coding sub-layer, 77 according to the alignment identity validity signal, and outputting the data to be decoded, buffer status signal and data validity signal which indicates if the data has been synchronized;

Receiving the data to be decoded and the data validity signal, determining whether to decode the data to be decoded according to the data validity signal, and outputting the decoded data, decoding status signal and the data polarity comparison signal;

Sampling with the clock of corresponding frequency according to the bit number of the received decoded data, converting the data in the data format of physical coding sub-layer 77 into the data in the data format conforming to media access control layer 78 and outputting to media access control layer 78, sampling the received data identity signal which, provided by physical coding sub-layer 77, indicates the transmission type under the clock frequency of the media access control layer 78 and outputting to media access control layer 78, and setting corresponding data transmission status signal according to received decoding status signal, data polarity comparison signal and buffer status signal and transmitting it to media access control layer 78.

In summary, The PCT express interface of the present invention enables physical coding sub-layer to receive or output 8-bit data as well as to receive or output 16-bit data by adding an input interface unit and output interface unit in the physical coding sub-layer, thereby the data formats of physical coding sub-layer and media access control layer are compatible; enables the physical coding sub-layer to be able to detect and handle data with sampling errors by adding data adjustment unit in the physical coding sub-layer, thereby it ensures the integrity of the data transmitted over physical coding sub-layer.

The invention claimed is:

1. A PCI express interface, including a down data channel for transmitting data from media access control layer to physical media access layer via physical coding sub-layer, wherein said down data channel comprises:
input interface unit for sampling with the clock of corresponding frequency according to the bit number of the received data transmitted from media access control layer to physical coding sub-layer, converting the data in the data format of media access control layer into the data to be coded conforming to the data format of physical coding sub-layer, sampling received data polarity control signal which controls the data polarity and data identity signal which indicates transmission type under the clock of physical coding sub-layer and outputting; and
coding unit for receiving the data to be coded, data identity signal and data polarity control signal outputted from input interface unit and the data polarity signal which is provided by physical coding sub-layer indicating the data polarity, coding the data to be coded according to the data polarity signal after controlled by the data polarity control signal, and determining whether to transmit the coded data to physical media access layer according to the data identity signal; and
wherein when received data is of 8 bits, the input interface unit samples data with the clock of 125 MHz frequency and outputs; and when received data is of 16 bits, it samples data with the clock of 250 MHz frequency and outputs.

2. The PCI express interface of claim 1, wherein said data identity signal is 2-bit data, and when the data bit value is "1", it represents transmitting symbol identity; when the data bit value is "0", it represents transmitting data.

3. The PCI express interface of claim 2, wherein said symbol identity comprises alignment identity and offset instruction.

4. The PCI express interface of claim 1, wherein when the value of said data polarity control signal is "1", it represents setting the data polarity signal to the opposite value; when the value of the data polarity control signal is "0", it represents the data polarity signal will remain the original value.

5. A signal processing method of PCI express interface, including a method of transmitting down data from media access control layer to physical media access layer via physical coding sub-layer, wherein said method of transmitting down data comprises:
sampling with the clock of corresponding frequency according to the bit number of the received data transmitted from media access control layer to physical coding sub-layer;
converting the data in the data format of media access control layer into the data to be coded conforming to the data format of physical coding sub-layer, sampling received data polarity control signal which controls the data polarity and data identity signal which indicates transmission type under the clock of physical coding sub-layer and outputting; and
receiving the data to be coded, data identity signal, data polarity control signal and the data polarity signal which is provided by physical coding sub-layer indicating the data polarity, coding the data to be coded according to the data polarity signal after controlled by data polarity control signal, and determining whether to transmit the coded data to physical media access layer according to the data identity signal; and
wherein when received data is of 8 bits, the input interface unit samples data with the clock of 125 MHz frequency and outputs; and when received data is of 16 bits, it samples data with the clock of 250 MHz frequency and outputs.

6. A PCI express interface, including an up data channel for transmitting data from physical media access layer to media access control layer via physical coding sub-layer, wherein said up data channel comprises:
synchronous buffer unit for receiving data transmitted over physical media access layer and the data locking signal which indicates if the data is valid, determining if the received data is to be synchronized into the data to be decoded that can be sampled correctly under the clock frequency of physical coding sub-layer according to the data locking signal, and outputting the data to be decoded, buffer status signal and the data validity signal which indicates if the data has been synchronized;
decoding unit for receiving the data to be decoded and the data validity signal, determining whether to decode the data to be decoded according to the data validity signal, and outputting the decoded data, decoding status signal and data polarity comparison signal; and output interface unit for sampling using the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type and outputting to media access control layer, and setting corresponding data transmission status signal according to received decoding status signal, data polarity comparison signal and buffer status signal and transmitting it to media access control layer; and wherein when the bit number of the received decoded data is of 8 bits, the clock with 125 MHZ frequency is used to sample the data; when the bit number of the received decoded data is of 16 bits, the clock with 250 MHZ frequency is used to sample the data.

7. A signal processing method of PCI express interface, including a method of transmitting up data from physical media access layer to media access control layer via physical coding sub-layer, wherein said method of transmitting up data comprises:

receiving data transmitted over physical media access layer and the data locking signal which indicates if the data is valid, determining if the received data is synchronized to the data to be decoded that can be sampled correctly under the clock frequency of physical coding sub-layer according to the data locking signal, and outputting the data to be decoded, buffer status signal and data validity signal which indicates if the data has been synchronized;

receiving the data to be decoded and the data validity signal, determining if the data to be decoded is decoded according to the data validity signal, and outputting the decoded data, decoding status signal and data polarity comparison signal; and sampling with the clock of corresponding frequency according to the bit number of the received decoded data, converting the data in the data format of physical coding sub-layer into the data conforming to the data format of media access control layer and outputting to media access control layer, sampling received data identity signal which, provided by physical coding sub-layer, indicates the transmission type under the clock frequency of media access control layer and outputting to media access control layer, and setting corresponding data transmission status signal according to the received decoding status signal, data polarity comparison signal and buffer status signal and transmitting it to media access control layer; and wherein when the bit number of the received decoded data is of 8 bits, the clock with 125 MHZ frequency is used to sample the data; when the bit number of the received decoded data is of 16 bits, the clock with 250 MHZ frequency is used to sample the data.

8. A PCI express interface, including an up data channel for transmitting data from physical media access layer to media access control layer via physical coding sub-layer, wherein said up data channel comprises:

data adjustment unit for receiving data transmitted from physical media access layer to physical coding sub-layer, the complement control signal which indicates whether to make complement operation and the data locking signal which indicates if the data is valid, determining whether to startup according to the data locking signal and whether to make complement operation according to the complement control signal, and adjusting the data which is transmitted over physical media access layer and shows sampling error, and outputting the adjusted data and alignment identity validity signal which indicates if the data has been adjusted;

synchronous buffer unit for receiving the adjusted data and alignment identity validity signal, determining if the received adjusted data is to be synchronized into the data to be decoded that can be sampled correctly under the clock frequency of physical coding sub-layer according to the alignment identity validity signal, outputting the data to be decoded and data validity signal which indicates if the data has been synchronized, and transmitting buffer status signal to media access control layer; and decoding unit for receiving the data to be decoded and the data validity signal, determining whether to decode the data to be decoded according to the data validity signal, and outputting the decoded data, decoding status signal and data polarity comparison signal to media access control layer; and wherein said data adjustment unit adjusts the data boundary according to the position of the alignment identity in the received data transmitted from physical media access layer to physical coding sub-layer.

9. A signal processing method of PCI express interface, including a method of transmitting up data from physical media access layer to media access control layer via physical coding sub-layer, wherein said method of transmitting up data comprises:

receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, and adjusting the data which is transmitted over physical media access layer and shows sampling error, and outputting the adjusted data and alignment identity validity signal which indicates if the data has been adjusted;

receiving the adjusted data and alignment identity validity signal, determining if the received adjusted data is to be synchronized into the data to be decoded that can be sampled correctly under the clock frequency of physical coding sub-layer according to the alignment identity validity signal, outputting the data to be decoded and data validity signal which indicates if the data has been synchronized, and transmitting buffer status signal to media access control layer; and receiving the data to be decoded and the data validity signal, determining whether to decode the data to be decoded according to the data validity signal, and outputting the decoded data, decoding status signal and data polarity comparison signal to media access control layer; and wherein adjusting the data includes: adjusting the data boundary according to the position of the alignment identity in the received data transmitted from physical media access layer to physical coding sub-layer.

10. A PCI express interface, including an up data channel for transmitting data from physical media access layer to media access control layer via physical coding sub-layer, wherein said up data channel comprises:

data adjustment unit for receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data which is transmitted over physical media access layer and shows sampling error, and outputting the adjusted data and alignment identity validity signal which indicates if the data has been adjusted;

synchronous buffer unit for receiving the adjusted data and alignment identity validity signal, determining if the received adjusted data is to be synchronized into the data to be decoded that can be sampled correctly under the clock frequency of physical coding sub-layer according to the alignment identity validity signal, and outputting the data to be decoded, buffer status signal and data validity signal which indicates if the data has been synchronized;

decoding unit for receiving the data to be decoded and data validity signal, determining whether to decode the data to be decoded according to the data validity signal, and outputting the decoded data, decoding status signal and the data polarity comparison signal; and output interface unit for sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to the received decoding status signal, data polarity comparison signal and buffer status signal and transmitting it to media access control layer;

wherein said data adjustment unit adjusts the data boundary according to the position of the alignment identity in the received data transmitted from physical media access layer to physical coding sub-layer; and wherein when the bit number of the received decoded data is of 8 bits, the clock with 125 MHZ frequency is used to sample the data; when the bit number of the received decoded data is of 16 bits, the clock with 250 MHZ frequency is used to sample the data.

11. A PCI express interface of claim 10, wherein, when said complement control signal is "1", then the data adjustment unit makes complement operation to the received data firstly; when said complement control signal is "0", then the data adjustment unit does not make complement operation to the received data.

12. A PCI express interface of claim 10, wherein, when said data locking signal is "0", the data adjustment unit keeps in waiting state; when said data locking signal is "1", the data adjustment unit starts up.

13. A PCI express interface of claim 10, wherein, the buffer status signal outputted from said synchronous buffer unit comprises buffer overflow signal and buffer underflow signal.

14. A PCI express interface of claim 10, wherein, when said decoding status signal is "0", it represents the data has been decoded correctly; when said decoding status signal is "1", it represents the data was not decoded correctly.

15. A PCI express interface of claim 10, wherein, when said data polarity comparison signal is "0", it represents the data has been decoded correctly; when said data polarity comparison signal is "1", it represents the data was not decoded correctly.

16. A PCI express interface of claim 10, wherein said data identity signal is 2-bit data, and when the value of data bit is "1", it represents the transmission of symbol identity; when the value of data bit is "0", it represents the transmission of data.

17. A PCI express interface of claim 16, wherein said symbol identity comprises alignment identity and offset instruction.

18. A PCI express interface of claim 10, wherein, when said data transmission status signal is "000", it represents the receiving of data is succeed; when said data transmission status signal is "001", it represents one offset instruction is added; when said data transmission status signal is "010", it represents one offset instruction is removed; when said data transmission status signal is "011", it represents physical coding sub-layer is in the state of detecting data; when said data transmission status signal is "100", it represents the data to be decoded does not exist in decoding table and thus decoding can not be done correctly; when said data transmission status signal is "101", it represents the status of the data of synchronous buffer unit is fully written; when said data transmission status signal is "110", it represents the status of the data of synchronous buffer unit is read empty; when said data transmission status signal is "111", it represents the data polarity corresponding to the data to be decoded does not exist in the decoding table and thus decoding can not be done correctly.

19. A signal processing method of PCI express interface, including a method of transmitting up data from physical media access layer to media access control layer via physical coding sub-layer, wherein said method of transmitting up data comprises:

receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data which is transmitted over physical media access layer and shows sampling error, and outputting the adjusted data and alignment identity validity signal which indicates if the data has been adjusted;

receiving the adjusted data and the alignment identity validity signal, determining if the received adjusted data is to be synchronized into the data to be decoded that can be sampled correctly under the clock frequency of physical coding sub-layer according to the alignment identity validity signal, and outputting the data to be decoded, buffer status signal and data validity signal which indicates if the data has been synchronized;

receiving the data to be decoded and the data validity signal, determining whether to decode the data to be decoded according to the data validity signal, and outputting the decoded data, decoding status signal and data polarity comparison signal; and sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer;

wherein adjusting the data includes: adjusting the data boundary according to the position of the alignment identity in the received data transmitted from physical media access layer to physical coding sub-layer; and wherein when the bit number of the received decoded data is of 8 bits, the clock with 125 MHZ frequency is used to sample the data; when the bit number of the received decoded data is of 16 bits, the clock with 250 MHZ frequency is used to sample the data.

20. A signal processing method of PCI express interface of claim 19, wherein, when said complement control signal is "1", then the data adjustment unit makes complement operation to the received data first; when said complement control signal is "0", then the data adjustment unit does not make complement operation to the received data.

21. A signal processing method of PCI express interface of claim 19, wherein, when said data locking signal is "0", the data adjustment unit is in waiting state; when said data locking signal is "1", the data adjustment unit starts up.

22. A signal processing method of PCI express interface of claim 19, wherein, when said data transmission status signal is "000", it represents the receiving of data is succeed; when said data transmission status signal is "001", it represents one offset instruction is added; when said data transmission status signal is "010", it represents one offset instruction is removed; when said data transmission status signal is "011", it represents physical coding sub-layer is in the state of detecting data; when said data transmission status signal is "100", it represents the data to be decoded does not exist in decoding table and thus decoding can not be done correctly; when said data transmission status signal is "101", it represents the status of the data of synchronous buffer unit is fully written; when said data transmission status signal is "110", it represents the status of the data of synchronous buffer unit is read empty; when said data transmission status signal is "111", it represents the data polarity corresponding to the data to be decoded does not exist in the decoding table and thus decoding can not be done correctly.

23. A PCI express interface, including physical coding sub-layer and a down data channel for transmitting data from media access control layer to physical media access layer via physical coding sub-layer and an up data channel for transmitting data from physical media access layer to media access control layer via physical coding sub-layer in physical coding sub-layer, wherein said physical coding sub-layer comprises:

input interface unit of down data channel for sampling with the clock of corresponding frequency according to the bit number of the received data that transmitted from media access control layer to physical coding sub-layer, converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

coding unit of down data channel for receiving the data to be coded, data identity signal, data polarity control signal, which are outputted from the input interface unit, and the data polarity signal which is provided by physical coding sub-layer indicating the data polarity, coding the data to be coded according to the data polarity signal after controlled by the data polarity control signal, and determining whether to transmit the coded data to physical media access layer according to the data identity signal;

data adjustment unit of up data channel for receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data which is transmitted over physical media access layer and shows sampling error, and outputting the adjusted data and alignment identity validity signal which indicates if the data has been adjusted;

synchronous buffer unit of up data channel for receiving the adjusted data and alignment identity validity signal, determining if the received adjusted data is to be synchronized into the data to be decoded that can be sampled correctly under the clock frequency of physical coding sub-layer according to the alignment identity validity signal, outputting the data to be decoded and the data validity signal which indicates if the data has been synchronized, and transmitting buffer status signal to media access control layer; and decoding unit of up data channel for receiving the data to be decoded and the data validity signal, determining whether to decode the data to be decoded according to the data validity signal, outputting the decoded data, decoding status signal and data polarity comparison signal and transmitting them to media access control layer;

wherein said data adjustment unit adjusts the data boundary according to the position of the alignment identity in the received data transmitted from physical media access layer to physical coding sub-layer; and wherein when the bit number of the received data is of 8 bits, the clock with 125 MHZ frequency is used to sample the data; when the bit number of the received data is of 16 bits, the clock with 250 MHZ frequency is used to sample the data.

24. A signal processing method of PCI express interface, including a method of transmitting down data from media access control layer to physical media access layer via physical coding sub-layer and a method of transmitting up data from physical media access layer to media access control layer via physical coding sub-layer, wherein said methods of transmitting down data and up data comprises:

sampling with the clock of corresponding frequency according to the bit number of received data that transmitted from media access control layer to physical coding sub-layer;

converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

receiving the data to be coded, data identity signal, data polarity control signal and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data which is transmitted over physical media access layer and shows sampling error, and outputting the adjusted data and alignment identity validity signal which indicates if the data has been adjusted;

receiving the adjusted data and alignment identity validity signal, determining if the received adjusted data is to be synchronized into the data to be decoded that can be sampled correctly under the clock frequency of physical coding sub-layer according to the alignment identity validity signal, and outputting the data to be decoded and data validity signal that indicates whether the data has been synchronized, and transmitting buffer status signal to media access control layer; and receiving the data to be decoded and the data validity signal, determining whether to decode the data to be decoded according to the data validity signal, outputting the decoded data, decoding status signal and data polarity comparison signal and transmitting them to media access control layer;

wherein adjusting the data includes: adjusting the data boundary according to the position of the alignment identity in the received data transmitted from physical media access layer to physical coding sub-layer;

wherein adjusting the data includes: adjusting the data boundary according to the position of the alignment identity in the received data transmitted from physical media access layer to physical coding sub-layer; and wherein when the bit number of the received data is of 8 bits, the clock with 125 MHZ frequency is used to sample the data; when the bit number of the received data is of 16 bits, the clock with 250 MHZ frequency is used to sample the data.

25. A PCI express interface, including physical coding sub-layer and a down data channel for transmitting data from media access control layer to physical media access layer via physical coding sub-layer and an up data channel for transmitting data from physical media access layer to media access control layer via physical coding sub-layer in physical coding sub-layer, wherein said physical coding sub-layer comprises:

input interface unit of down data channel for sampling with the clock of corresponding frequency according to the bit number of received data that transmitted from media access control layer to physical coding sub-layer, converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

coding unit of down data channel for receiving the data to be coded, data identity signal and data polarity control signal, which are outputted from input interface unit, and the data polarity signal, which is provided by physical coding sub-layer indicating the data polarity, coding the data to be coded according to the data polarity signal after controlled by the data polarity control signal, and determining whether to transmit the coded data to physical media access layer according to the data identity signal;

synchronous buffer unit of up data channel for receiving the data transmitted over physical media access layer and the data locking signal which indicates if the data is valid, determining if the received data is to be synchronized into the data to be decoded that can be sampled correctly under the clock frequency of physical coding sub-layer according to the data locking signal, and outputting the data to be decoded, buffer status signal and data validity signal that indicates if data has been synchronized;

decoding unit of up data channel for receiving the data to be decoded and the data validity signal, determining whether to decode the data to be decoded according to the data validity signal, and outputting the decoded data, decoding status signal and the data polarity comparison signal; and output interface unit of up data channel for sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer;

wherein when the bit number of the received decoded data is of 8 bits, the clock with 125 MHZ frequency is used to sample the data; when the bit number of the received decoded data is of 16 bits, the clock with 250 MHZ frequency is used to sample the data; and wherein when the bit number of the received data is of 8 bits, the clock with 125 MHZ frequency is used to sample the data; when the bit number of the received data is of 16 bits, the clock with 250 MHZ frequency is used to sample the data.

26. A signal processing method of PCI express interface, including a method of transmitting down data from media access control layer to physical media access layer via physical coding sub-layer and a method of transmitting up data from physical media access layer to media access control layer via physical coding sub-layer, wherein said methods of transmitting down data and up data comprises:

sampling with the clock of corresponding frequency according to the bit number of received data that transmitted from media access control layer to physical coding sub-layer;

converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

receiving the data to be coded, data identity signal, data polarity control signal and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

receiving data transmitted over physical media access layer and the data locking signal which indicates if the data is valid, determining if the received data is to be synchronized into the data to be decoded that can be sampled correctly under the clock frequency of physical coding sub-layer according to the data locking signal, and outputting the data to be decoded, buffer status signal and data validity signal which indicates if the data has been synchronized;

receiving the data to be decoded and the data validity signal, determining whether to decode the data to be decoded according to the data validity signal, and outputting the decoded data, decoding status signal and the data polarity comparison signal; and sampling with the clock of corresponding frequency according to the bit number of received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer;

wherein when the bit number of the received decoded data is of 8 bits, the clock with 125 MHZ frequency is used to sample the data; when the bit number of the received decoded data is of 16 bits, the clock with 250 MHZ frequency is used to sample the data; and wherein when the bit number of the received data is of 8 bits, the clock with 125 MHZ frequency is used to sample the data; when the bit number of the received data is of 16 bits, the clock with 250 MHZ frequency is used to sample the data.

27. A PCI express interface, including physical coding sub-layer and a down data channel for transmitting data from media access control layer to physical media access layer via physical coding sub-layer and an up data channel for transmitting data from physical media access layer to media access control layer via physical coding sub-layer in physical coding sub-layer, wherein said physical coding sub-layer comprises:

input interface unit of down data channel for sampling with the clock of corresponding frequency according to the bit number of the received data that transmitted from media access control layer to physical coding sub-layer, converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

coding unit of down data channel for receiving the data to be coded, data identity signal and data polarity control signal outputted from input interface unit and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

data adjustment unit of up data channel for receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data which is transmitted over physical media access layer and shows sampling error, and outputting the adjusted data and alignment identity validity signal which indicates if the data has been adjusted;

synchronous buffer unit of up data channel for receiving the data and the alignment identity validity signal, determining if the received adjusted data is to be synchronized into the data to be decoded that can be sampled correctly under the clock frequency of physical coding sub-layer according to the alignment identity validity signal, and outputting the data to be decoded, buffer status signal and data validity signal which indicates if the data has been synchronized;

decoding unit of up data channel for receiving the data to be decoded and the data validity signal, determining whether to decode the data to be decoded according to the data validity signal, and outputting the decoded data, decoding status signal and the data polarity comparison signal; and output interface unit of up data channel for sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer;

wherein said data adjustment unit adjusts the data boundary according to the position of the alignment identity in the received data transmitted from physical media access layer to physical coding sub-layer;

wherein when the bit number of the received decoded data in the up data channel is of 8 bits, the clock with 125 MHZ frequency is used to sample the data; when the bit number of the received decoded data in the up data channel is of 16 bits, the clock with 250 MHZ frequency is used to sample the data; and wherein when the bit number of the received data in the down data channel is of 8 bits, the clock with 125 MHZ frequency is used to sample the data; when the bit number of the received data in the down data channel is of 16 bits, the clock with 250 MHZ frequency is used to sample the data.

28. The PCI express interface of claim 27, wherein, the data identity signal, which is received by input interface unit of said down data channel, is 2-bit data, when the data bit value is "1", it represents transmitting of symbol identity; when the data bit value is "0", it represents transmitting of data.

29. The PCI express interface of claim 28, wherein said symbol identity comprises alignment identity and offset instruction.

30. The PCI express interface of claim 27, wherein, when the value of data polarity control signal, which is received by input interface unit of said down data channel, is "1", it represents setting the data polarity signal to the opposite value; when the value of the data polarity control signal is "0", it represents the data polarity signal will remain the original value.

31. A PCI express interface of claim 27, wherein, when the complement control signal, which is received by data adjustment unit of said up data channel, is "1", then the data adjustment unit makes complement operation to the received data first; when the complement control signal is "0", then the data adjustment unit does not make complement operation to the received data.

32. A PCI express interface of claim 27, wherein, when the data locking signal, which is received by data adjustment unit of said up data channel, is "0", the data adjustment unit is in waiting state; when the data locking signal is "1", the data adjustment unit starts up.

33. A PCI express interface of claim 27, wherein, the buffer status signal, which is outputted from the synchronous buffer unit of said up data channel, comprises buffer overflow signal and buffer underflow signal.

34. A PCI express interface of claim 27, wherein, when the decoding status signal, which is outputted from the decoding unit of said up data channel, is "0", it represents the data has been decoded correctly; when the decoding status signal is "1", it represents the data was not decoded correctly.

35. A PCI express interface of claim 27, wherein, when the data polarity comparison signal, which is outputted from the decoding unit of said up data channel, is "0", it represents the data has been decoded correctly; when the data polarity comparison signal is "1", it represents the data was not decoded correctly.

36. A PCI express interface of claim 27, wherein, the data identity signal, which is received by the output interface unit of said up data channel and provided by physical coding sub-layer, is 2-bit data, and when the value of the data bit is "1", it represents transmission of symbol identity; when the value of the data bit is "0", it represents transmission of data.

37. A PCI express interface of claim 27, wherein said symbol identity comprises alignment identity and offset instruction.

38. A PCI express interface of claim 27, wherein, when said data transmission status signal is "000", it represents the receiving of data is succeed; when said data transmission status signal is "001", it represents one offset instruction is added; when said data transmission status signal is "010", it represents one offset instruction is removed; when said data transmission status signal is "011", it represents physical coding sub-layer is in the state of detecting data; when said data transmission status signal is "100", it represents the data to be decoded does not exist in decoding table and thus decoding can not be done correctly; when said data transmission status signal is "101", it represents the status of the data of synchronous buffer unit is fully written; when said data transmission status signal is "110", it represents the status of the data of synchronous buffer unit is read empty; when said data transmission status signal is "111", it represents the data polarity corresponding to the data to be decoded does not exist in the decoding table and thus decoding can not be done correctly.

39. A signal processing method of PCI express interface, including a method of transmitting down data from media access control layer to physical media access layer via physical coding sub-layer and a method of transmitting up data from physical media access layer to media access control layer via physical coding sub-layer, wherein said methods of transmitting down data and up data comprises:

sampling with the clock of corresponding frequency according to the bit number of the received data that transmitted from media access control layer to physical coding sub-layer;

converting the data in the data format of media access control layer into the data to be coded in the data format conforming to physical coding sub-layer, and sampling the received data polarity control signal which controls data polarity and data identity signal which indicates transmission type under the clock of physical coding sub-layer and outputting;

receiving the data to be coded, data identity signal and data polarity control signal and the data polarity signal provided by physical coding sub-layer indicating the data polarity, coding the data to be coded according to the data polarity signal after controlled by the data polarity control signal, and determining whether to transmit the coded data to physical media access layer according to the data identity signal;

receiving the data, the complement control signal which indicates whether to make complement operation and the data locking signal which indicates if the data is valid, which are transmitted from physical media access layer to physical coding sub-layer, determining whether to startup according to the data locking signal and whether to make complement operation according to the complement control signal, adjusting the data which is transmitted over physical media access layer and shows sampling error, and outputting the adjusted data and alignment identity validity signal which indicates if the data has been adjusted;

receiving the adjusted data and the alignment identity validity signal, determining if the received adjusted data is to be synchronized into the data to be decoded that can be sampled correctly under the clock frequency of physical coding sub-layer according to the alignment identity validity signal, and outputting the data to be decoded, buffer status signal and data validity signal which indicates if the data has been synchronized;

receiving the data to be decoded and the data validity signal, determining whether to decode the data to be decoded according to the data validity signal, and outputting the decoded data, decoding status signal and the data polarity comparison signal; and sampling with the clock of corresponding frequency according to the bit number of the received decoded data, converting the data in the data format of physical coding sub-layer into the data in the data format conforming to media access control layer and outputting to media access control layer, sampling the received data identity signal which, provided by physical coding sub-layer, indicates the transmission type under the clock frequency of media access control layer and outputting to media access control layer, and setting corresponding data transmission status signal according to received decoding status signal, data polarity comparison signal and buffer status signal and transmitting it to media access control layer;

wherein adjusting the data includes adjusting the data boundary according to the position of the alignment identity in the received data transmitted from physical media access layer to physical coding sub-layer;

wherein when the bit number of the received decoded data in the up data channel is of 8 bits, the clock with 125 MHZ frequency is used to sample the data; when the bit number of the received decoded data in the up data channel is of 16 bits, the clock with 250 MHZ frequency is used to sample the data; and wherein when the bit number of the received data in the down data channel is of 8 bits, the clock with 125 MHZ frequency is used to sample the data; when the bit number of the received data in the down data channel is of 16 bits, the clock with 250 MHZ frequency is used to sample the data.

40. A signal processing method of PCI express interface of claim 39, wherein, when said data transmission status signal is "000", it represents the receiving of data is succeed; when said data transmission status signal is "001", it represents one offset instruction is added; when said data transmission status signal is "010", it represents one offset instruction is removed; when said data transmission status signal is "011", it represents physical coding sub-layer is in the state of detecting data; when said data transmission status signal is "100", it represents the data to be decoded does not exist in decoding table and thus decoding can not be done correctly; when said data transmission status signal is "101", it represents the status of the data of synchronous buffer unit is fully written; when said data transmission status signal is "110", it represents the status of the data of synchronous buffer unit is read empty; when said data transmission status signal is "111", it represents the data polarity corresponding to the data to be decoded does not exist in the decoding table and thus decoding can not be done correctly.

* * * * *